United States Patent [19]

Schroeder et al.

[11] 4,209,251
[45] Jun. 24, 1980

[54] SINGLE SHOT MICROFICHE FILM DUPLICATOR

[75] Inventors: Henry G. Schroeder; Henry F. Hasselvander, both of Metairie, La.

[73] Assignee: Innovative Technology Inc., New Orleans, La.

[21] Appl. No.: 903,602

[22] Filed: May 8, 1978

[51] Int. Cl.² .............................................. G03B 27/10
[52] U.S. Cl. ..................................................... 355/110
[58] Field of Search ................... 355/100, 110, 97, 99, 355/104, 106, 132

[56] References Cited

U.S. PATENT DOCUMENTS

| | | | |
|---|---|---|---|
| 2,441,912 | 5/1948 | Streich | 355/110 |
| 2,933,997 | 4/1960 | Trump | 355/106 |
| 3,416,863 | 12/1968 | Ralston | 355/110 |
| 3,958,880 | 5/1976 | Washio et al. | 355/106 |

Primary Examiner—Donald A. Griffin
Attorney, Agent, or Firm—C. Emmett Pugh & Associates

[57] ABSTRACT

An automatic microfiche duplicator having an upper receiving slot for receiving a copy sheet and master sheet, and a first conveyor which transports the copy sheet and master sheet together in a generally horizontal direction past an exposure cylinder where the copy is exposed and then to a separator which automatically separates the master sheet down and away from the copy sheet. Three embodiments of the separator are illustrated (FIGS. 9-11, 12-14, and 15a-c). The master sheet is then delivered to a reverse, lower conveyor which conveys the master sheet in a reverse horizontal path to an exit tray located below and near the receiving slot. A second upper conveyor transports the exposed copy sheet in the same general horizontal direction as before to a belt driven cylindrical heat developer and then down to a cooling tray where the copy is held for a few seconds. An automatic mechanism tilts the tray which is slotted and delivers the cooled copy to the lower conveyor (made of a set of ring belts) which then delivers the copy back the same reverse path followed by the master to the exit tray.

20 Claims, 18 Drawing Figures

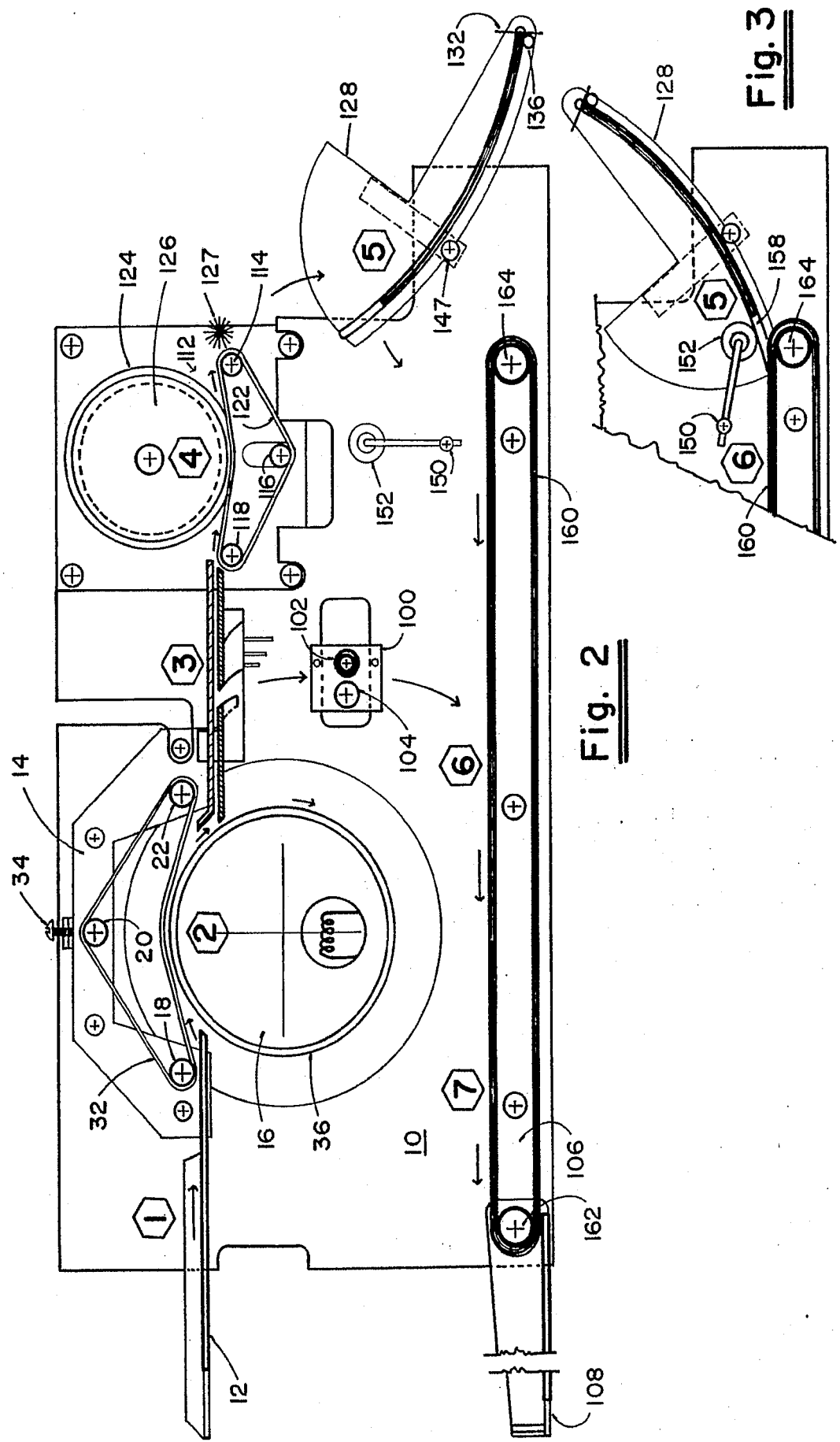

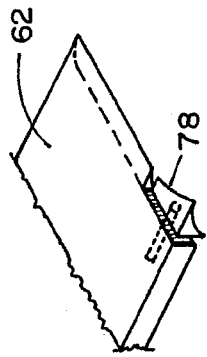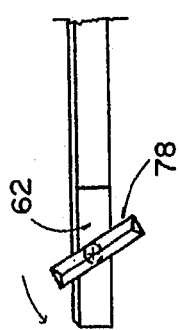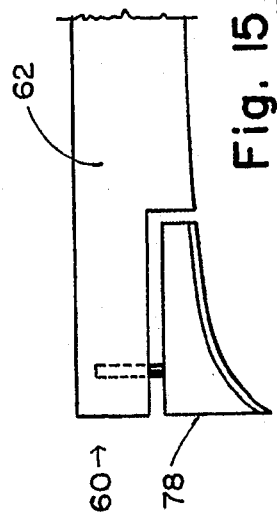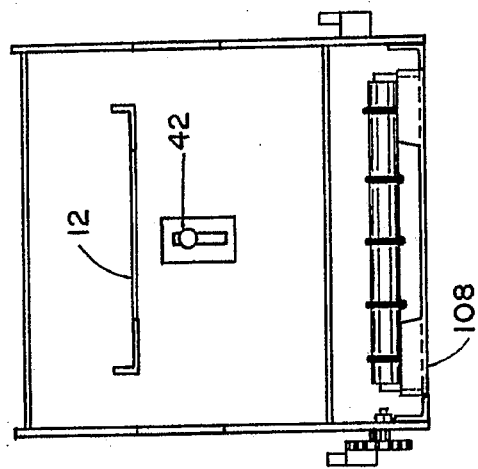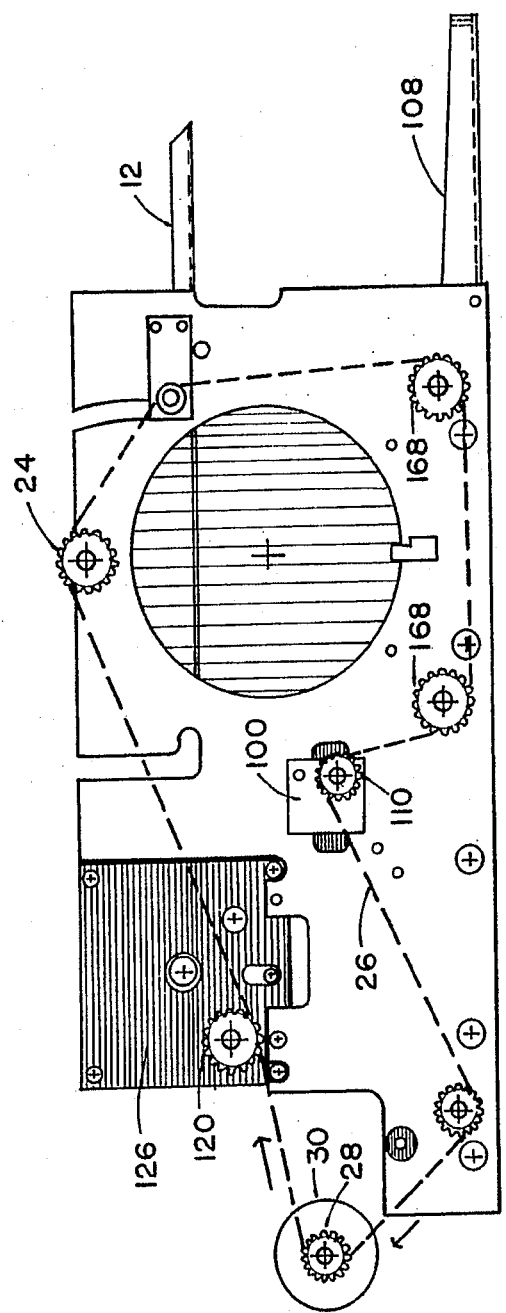

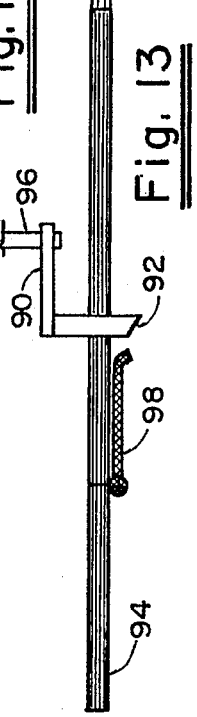
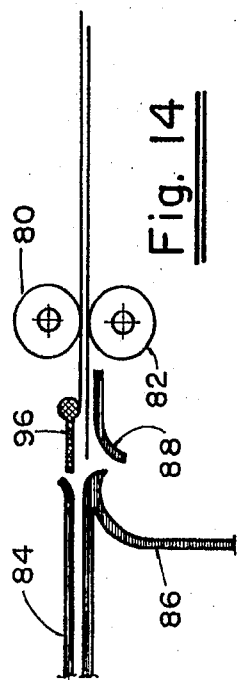
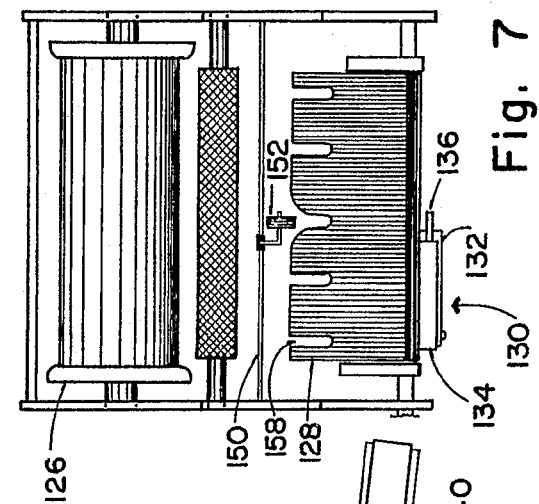
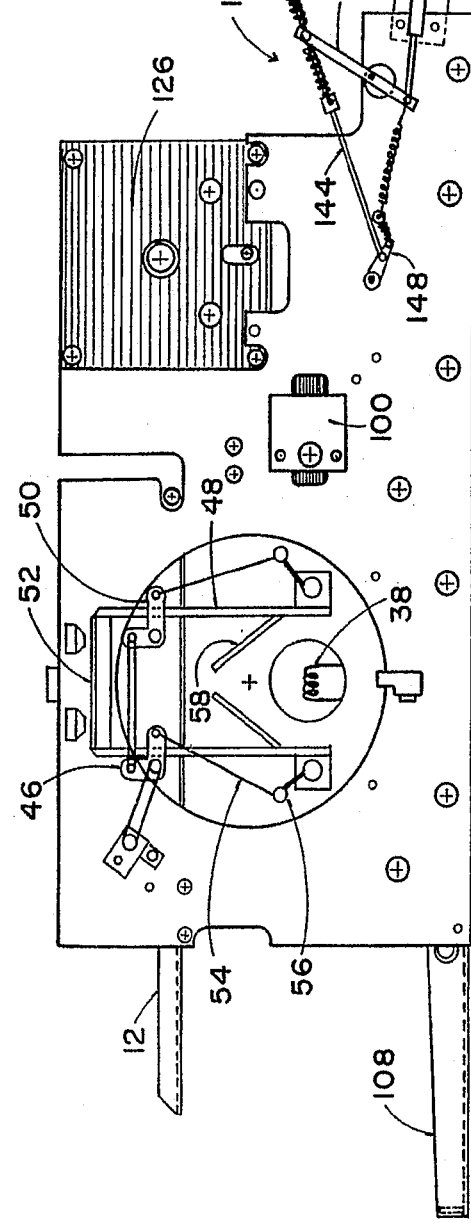

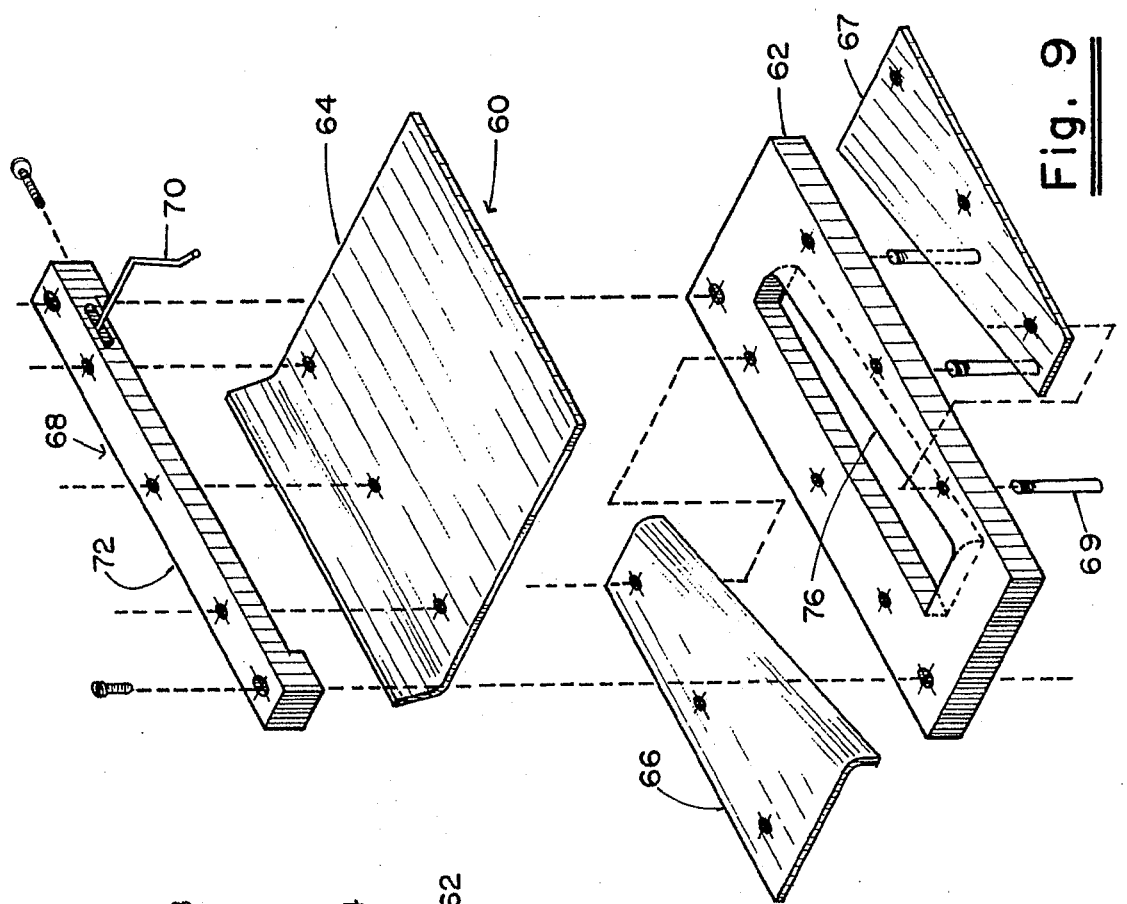

SINGLE SHOT MICROFICHE FILM DUPLICATOR

BACKGROUND OF THE INVENTION

1. Field of the Invention

The present invention relates to film developing systems, and more particularly relates to an automatic microfiche duplicator using for example vesicular film or other heat developed film processes or diazo process.

2. General Background and Prior Art

Microfiche photographic duplicating techniques are well known; several processes are employed. At least one process, vesicular photography, is a duplicating method using light and heat alone, without chemical processing. It is to the field of vesicular photography that the preferred embodiment of the present invention is primarily directed.

Briefly, vesicular photography may be explained as follows:

Vesicular film has a thin layer of photosensitive emulsion coated onto a suitable support, either transparent or opaque. The main ingredient is a themoplastic resin which, under normal storage and use conditions, is hard and stable. Within this resin layer, which is normally between 0.0002 inches and 0.0005 inches in thickness, there is uniformly dispersed an ultraviolet sensitive compound, or sensitizer, chemically similar to the compounds employed is diazotype papers and films. Upon exposure to ultraviolet light, the sensitizer decomposes, and one of the products of its photolysis is nitrogen gas, which is trapped within the plastic layer and constitutes a "latent image." This latent image is converted to a visible image by the application of heat. The thermoplastic softens and the gas expands to form microscopic bubbles or "vesicles". These vesicles are the image elements of the vesicular film. In contrast to the conventional silver-halide photography and diazotypy, the vesicular process yields a light-scattering image rather than a light absorbing one.

While duplicating devices which employ the vesicular process have been constructed, none have provided a fully automatic, single copy or single shot duplicator. Typically it has been necessary for the operator of such devices, which have been very complex and expensive, to continuously handle and be with the film for up to one minute to get a copy. Changing master sheets is usually a cumbersome procedure. Some duplicators use only roll film and require accurately keyed cutting mechanisms, which further add to the complexity and expense of those devices.

The present invention eliminates this problem by providing in its preferred embodiment a fully automatic heat development type film duplicator which yields copies in little more than ten seconds. It achieves this time efficiency in a most compact, simple, reliable and relatively inexpensive device.

BRIEF DISCUSSION OF THE INVENTION

The duplicator device of the preferred embodiment of the present invention provides fully automatic processing of heat development type films. The preferred embodiment is provided with an upper entrance tray and a lower exit tray which are conveniently located at the front of the device. A master sheet of film, for example a standard sheet of microfiche, is placed against a corresponding copy sheet, preferably emulsion to emulsion, to form a set. This set is inserted, copy on top, into the entrance tray where it is engaged by a first horizontal conveyor. The conveyor transports the set across an ultraviolet exposure element, preferably a silicone belt driven rotating cylinder, where the copy is exposed. The first conveyor then transports the set to a separator where the master is separated from the copy and diverted down to be returned to the exit tray by a lower reverse conveyor. A second horizontal conveyor engages the exposed copy and transports it from the separator and across a heat developer, preferably a silicone belt driven heat cylinder where it is developed. The developed copy is then transported down to a cooling tray which is preferably reversely curved to counteract any curling tendencies in the developed copy induced by the heat development.

A small switch located on the tray is activated by the delivered copy and in turn activates a timing circuit, set to clock a small interval, approximately three seconds. At the end of this interval the timing circuit activates a transfer mechanism which tilts the tray and causes the cooled copy to be delivered to the lower reverse conveyor.

The reverse conveyor transports the cooled copy again past the exposure element, and its bottom, where the copy is once more exposed. This second exposure causes decomposition of any residual sensitizer in the previously unexposed areas. The nitrogen gas thus produced is allowed to diffuse out of the emulsion coating. In this way the copy is cleared and subsequent inadvertent exposure and developing of the previously unexposed areas (e.g. in a poorly cooled slide projector) is prevented. The copy continues on and is finally delivered to the exit tray.

The entire process, from set insertion to delivery of the developed copy takes approximately ten seconds. Since the master is returned first in about half the time, process time for multiple copies is even further reduced; up to four hundred copies per hour is possible.

The device may be provided with a copy counter and totalizer counter, and may be constructed modularly for convenience and ease of service.

The paths of the master and copy and the relative positions of the various operative portions of the device allow it to be highly compact.

Three very effective, alternative separators are disclosed, along with a most effective sloted tray and an associated ring band reverse conveyor system.

BRIEF DESCRIPTION OF THE DRAWINGS

For a further understanding of the nature and objects of the present invention, reference should be had to the following detailed description taken in conjunction with the accompanying drawings, in which like parts are given like reference numerals and wherein:

FIG. 2 is a cross-sectional, simplified view of the preferred embodiment of the apparatus of the present invention with the tray in its "up" disposition;

FIG. 3 is a partial, cooling cross-sectional view of the apparatus of FIG. 2 but showing the cooling tray in the "down" position to deliver the cooled copy to the second conveyor;

FIG. 4 is a side view of the apparatus shown in FIG. 2 showing the motor and drive mechanism;

FIG. 5 is a front view of the apparatus shown in FIG. 2;

FIG. 6 is a side view taken opposite the side view shown in FIG. 4;

FIG. 7 is an end view of the apparatus shown in FIG. 2;

FIG. 9 is an exploded, perspective view of the separator assembly of the apparatus shown in FIG. 2;

FIG. 10 is a plan view of the separator assembly of the apparatus shown in FIG. 2;

FIG. 11 is a side, cross-sectional view taken on line 11—11 of FIG. 10;

FIG. 12 is a side view of a second, alternative embodiment of the separator mechanism for the apparatus shown in FIG. 2;

FIG. 13 is a partial, top view of the alternative embodiment of the separator mechanism shown in FIG. 12;

FIG. 14 is a side, cross-sectional view of the alternative embodiment of the separator shown in FIG. 12;

FIG. 15a is a partial, top view of a third, alternative embodiment of the separator mechanism for the apparatus shown in FIG. 2; while FIG. 15b is a partial, end view of the alternative embodiment of the separator shown in FIG. 15a; and FIG. 15c is a partial, isometric view of the alternative embodiment of the separator shown in FIG. 15a.

DETAILED DESCRIPTION OF THE PREFERRED EMBODIMENTS

Figure 1:
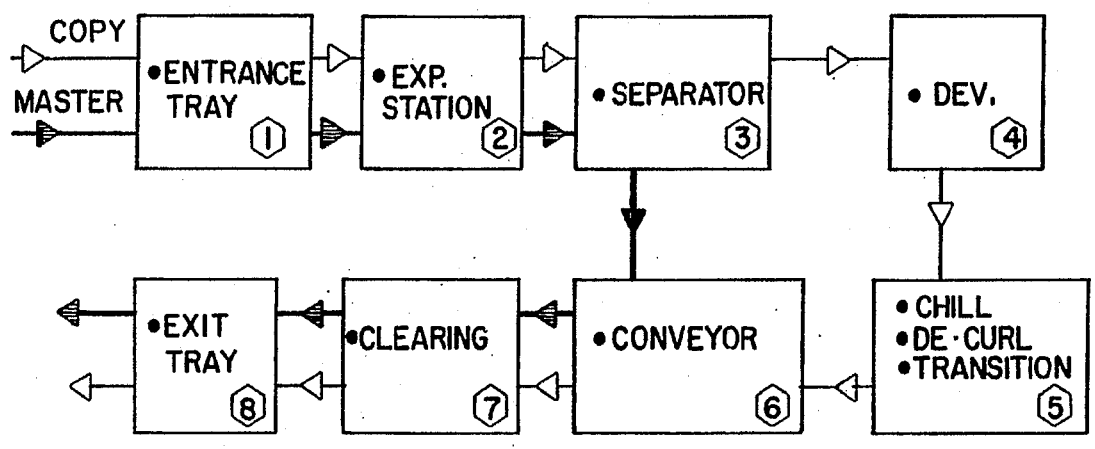
FIG. 1 is a flow chart showing the various steps performed by the preferred embodiment of the present invention, with the path of the master being indicated by the set of darker arrows and the path of the copy being indicated by the set of lighter arrows.

Referring now to the drawings, FIG. 1 is a flow chart showing the various stations of the preferred embodiment of the present invention. An entrance tray station 1 is provided where two sheets of microfiche, a master and a copy, are inserted together, emulsion to emulsion. The master, containing an image to be transferred, is placed beneath the copy, which is an undeveloped sheet of film, preferably of the same size as the master and, in the preferred embodiment, of the vesicular film type. The copy and master together form a set.

At the entrance tray station 1 the set is picked up by a conveyor and conveyed through an exposure station 2 to a separator station 3. At the separator station 3 the master is automatically diverted to an intermediate portion of a lower, return or reverse conveyor assembly 6 which transports the master to an exit tray station 8. The copy meanwhile passes through the separator station 3 where it is then conveyed through a developing station 4 to a chill, decurl transition station 5, where the copy is held for a few seconds and then also delivered to the conveyor assembly 6 at its rear portion. The return conveyor assembly 6 transports the copy through a clearing station 7 to the exit tray station 8, completing the cycle.

Thus the set of paths followed by the master (note set of darker arrows in FIG. 1) and copy (note set of lighter arrows) are similar ones, that is first going horizontally out, then down and then horizontally back, but with the copy going out further before reversing back to allow for developing and cooling of the copy. Such path selections produce a most compact, effective and efficient system.

FIG. 2 is a cross-sectional, simplified view of the preferred embodiments of the present invention, while FIGS. 4 and 6 are opposite side views, FIG. 5 is a front end view, and FIG. 7 is a rear end view thereof. The entire unit is modularly assembled on chassis 10 for convenience in assembly and repair. It is noted that the housing for the duplicator is not shown for simplicity purposes and in order to see the internal operative portions of the device.

As can be seen, entrance tray 12 is mounted on the upper part of the front of the chassis 10 and extends into the body of the chassis 10. A first conveyor assembly 14 bears on a cylindrical, rotating exposure unit 16. First conveyor assembly 14 is comprised of three shafts 18, 20, 22 mounted on ball bearings so as to freely rotate. Shaft 20 has attached on one end a sprocket wheel 24 which is driven by chain 26 which is in turn driven by sprocket wheel 28 mounted on motor 30: Note idler wheels 168 in FIG. 4 which serve to direct the path of chain 26 to prevent its interference with other operating elements.

Shaft 20 is thus the driven shaft for conveyor assembly 14 and drives belt 32. The height of shaft 20 may be varied by adjustment screw 34 to adjust the tension of belt 32. Belt 32 engages the inserted set in exposure unit 16 at rotating transparent exposure cylinder 36. The set is transported across cylinder 36 where the copy is exposed by ultraviolet radiation through the master. Within cylinder 36 a silicon element 38 provides the ultraviolet radiation for the exposure.

A trap door shutter assembly 40 is provided above element 38 and may be manually adjusted by exposure lever 42 to provide proper exposure. Exposure lever 42 is connected to a cable 44 which is in turn connected at its opposite end to an "L" shaped pivot arm 46, mounted on a shutter subhousing frame 48, shaped approximately like an inverted "U," as shown. A second "L" shaped pivot arm 50 is likewise mounted on frame 48 and connected to pivot arm 46 by a rod 52 so that both move in tandem. Each pivot arm is likewise connected by a rod 54 to a lower shutter base leg 56 on shutter 58. By moving lever 42, shutters 58 may be opened or closed a desired amount for proper exposure.

Belt 32 carries the set across cylinder 36 to separator assembly 60. FIGS. 9, 10 and 11 show the separator assembly 60 of the preferred embodiment. FIGS. 12, 13 and 14 show a second alternative embodiment for the separator station 3, while FIGS. 15a, b and c show a third, alternative embodiment.

The preferred embodiment of separator assembly 60 of FIGS. 9–11 is comprised of a slotted support plate 62, upper and lower guide plates 64, 66, 67, a separator wire unit 68 and three lower guide rods 69. Separator wire 70 is formed with a 45° bend and is pivotally mounted in brace 72 as shown, to cross the edge of the path of the set. A spring 74 holds the wire in place, but the wire may be pushed out of the set path by applied pressure from the master film. The preferred embodiment contemplates the use of a copy sheet having a small triangular piece cut off a corner, leaving an exposed angled corner. It is this angled corner area which the wire 70 encounters as the set passes through the separator. The master, having no such removed angled corner, is deflected down by the wire 70 acting against the exposed ninety degree corner of the master to engage the engagement edge 76 of the slot in support plate 62. The angled corner of the copy, however, slides over the angled leg wire 70 and pushes it out of the way, allowing the copy to continue on in a straight horizontal path. The engagement edge 76 in the slot of plate 62 is cut at a slight angle, sloping away from wire 70, as shown in FIG. 10. This causes the master to gradually deflect across its entire leading edge as it moves forward without "buckling" and jamming. The surface of the slot in plate 72 beneath engagement edge 76 is likewise angled inward, as can be seen in FIG. 11, also to insure against the buckling of the master. Guide rods 69 guide the deflected master to roller assembly 100, discussed below.

A second alternative separator assembly 60', shown in FIGS. 15 a–c, is similar to that 60 of the preferred embodiment except that instead of having a separator wire unit, it has a separating pivot member 78, mounted, as shown, in plate 62. In its rest position (note FIG. 15b), it presents at an angle a curved edge to the corner of the film set where the copy has the angled cut. The curved edge of member 78 deflects the master down, while the angled corner slides over the member 78 and causes it to pivot to a second position (note FIG. 15c) in which the curved edge is even with the top surface of plate 62.

The third alternative separator assembly 60", shown in FIGS. 12–14 is intended for use with sets in which both copy and master are rectangular, and neither has a cutout corner. The unit 60' includes a pair of driven guide rollers, upper rollers 80 and lower roller 82, upper guide plate 84, lower guide plates 86 and 88, and a trip arm 90 which has one end 92 engaged in the slot of a sliding plate 94, and the other end 96 mounted over the opening between the lower guide plates 86 and 88. Sliding plate 94 is slidably mounted on chassis 10.

A spring loaded cocking pin 98 is mounted on sliding plate 94, as shown in FIGS. 12 and 13. A solenoid (not shown) engages plate 94 and is activated by a microswitch which is mounted on lower guide sheet 88 and is tripped by impingement of the on coming set. FIGS. 12, 13 and 14 show the separator in a deactivated position. When the microswitch is tripped, the plate 94 is urged toward the rollers. As it slides, end 92 moves with respect to the slot, past the end of cocking pin 98 which is deflected out, by virtue of its beveled end, and snaps back, thus, "cocking" the trip arm 90. At the end of its travel, the end of plate 94 bears upon upper roller 84, causing it to pause in its rotation for a moment, allowing the master to slide a small distance from under the copy. The solenoid then deactivates, allowing the plate 94 to slide back. Cocking pin 98 forces end 92 down in the slot of plate 94, which causes trip end 96 of arm 90 to pivot down onto the path of the oncoming set. Because the master now extends a short interval from the front edge of the copy, only the master is deflected by trip end 96 which immediately snaps back to its rest position. The remainder of the separator cycle is the same as in the first two embodiments.

The diverted master enters twin roller assembly 100, having one driven roller 102 and one free rolling roller 104, bearing against one another. This assembly insures that the master will be freed of the separator and delivered to lower return conveyor assembly 106. Driven roller 102 has a sprocketed wheel 110 connected to one end and is driven by chain 26, as shown in FIG. 4.

Lower return conveyor 106 is comprised of a free rolling roller 162 and a driven roller mounted on chassis 10, and flexible belts or ring bands 160 which extend between rollers 162, 164, as shown in FIG. 2. Roller 164 has a sprocketed wheel 166 mounted on one end, which is driven by chain 26. Conveyor 106 transports the master to exit tray 108.

The exposed copy in the meantime continues horizontally through separator assembly 60 and is picked up by second horizontal conveyor assembly 112 which is similar to the first conveyor assembly 14, but is inverted, as shown in FIG. 2. It likewise has three rollers, driven roller 114, and two free rolling rollers 116, 118. Driven roller 112 has attached to one end a sprocket wheel 120 driven by chain 26. Belt 122 extends between them and bears on rotating developer cylinder 124 of developer assembly 126. Developer cylinder 124 houses a silicon heating element for heat development of the copy.

The second conveyor assembly 112 conveys the copy past the developer 126, through metal tinsel 127 which removes accumulated static, and deposits it down in cooling tray 128, pivotally mounted on chassis 10 as shown. FIG. 2 shows tray 128 in the normal position for receiving the developed copy, while FIG. 3 shows tray 128 in the transfer position. Tray 128 is preferably reversely curved to counteract the opposite curling tendencies in the copy induced by the heating of developer 126.

Cooling tray 128 has mounted thereon a switch 130, comprising a film stop switch wire 132, switch wire mounting bar 134 and a brass switch rod 136 against which wire 132 normally rests. Switch assembly 130 is thus normally closed. Wire 132 extends upward through a small hole in the rear of the tray 128, as shown. When a copy is deposited on tray 128, wire 132 prevents the copy from falling off the end of tray 128. The weight of the copy against wire 132 also opens switch 130. Switch 130 is connected to timing circuitry (not shown) which is activated by the opening of switch 130.

Figure 8B:
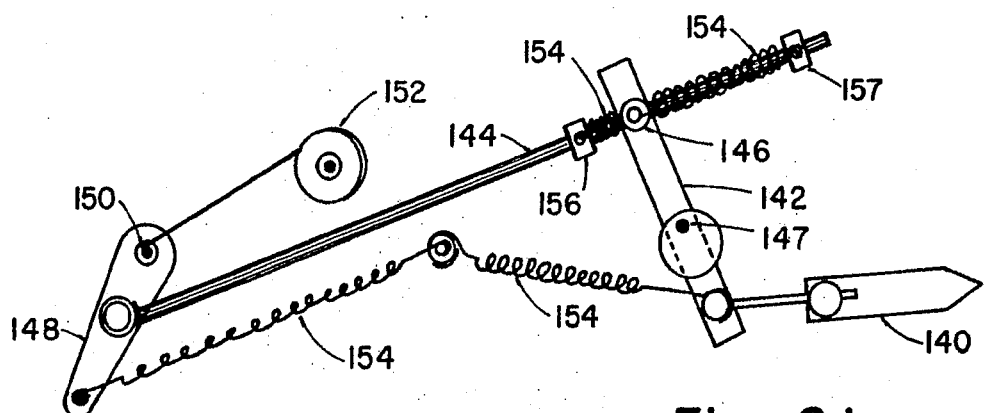
FIG. 8b is an enlarged view of the tray and wheel actuator assembly of FIG. 8a showing the assembly in the activated or "down" position of FIG. 3.
Figure 8A:
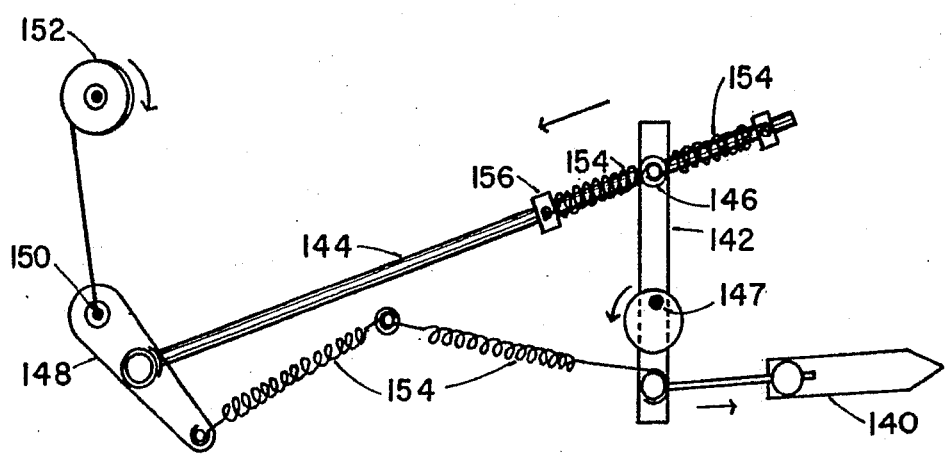
FIG. 8a is an enlarged view of the tray and wheel actuation assembly of the device shown in FIG. 2.

Referring now to FIG. 6, there can be seen a tray tilt and wheel engagement assembly 138 mounted on chassis 10. FIGS. 8a and 8b are enlarged views of assembly 138 showing the two extreme positions. Tilt assembly 138 is comprised of solenoid 140, tray tilt arm 142, connected at one end to solenoid 140 and at the other to wheel engagement rod 144 by way of sliding collar 146 mounted on rod 144, and pivotally mounted on tray tilt axle 147. Rod 144 is connected at one end to wheel pivot arm 148 which is in turn connected to wheel axle 150 on which wheel 152 is mounted, as shown. Springs 154 hold tray 128 and wheel 152 in the respective rest position as shown in FIG. 2, and cushion the impact of arm 142 against collers 156, 157.

When switch 130 opens, the timing circuitry clocks a short interval for the cooling of the copy sheet. After the interval passes, a pulse is applied to solenoid 140 which causes arm 142 to tilt, tilting tray 128, and causing collar 146 to slide down rod 144. When collar 146 impinges on fixed collar 156 on rod 144, pivot arm 148 pivots, causing wheel 152 to pivot. At full tilt, slots 158 in tray 128 receive the ring bands 160 of lower return conveyor 106, which contact the copy. Wheel 152 which has a rubber surface, is brought to bear against the copy above the center one of the rubber belts 160 which carry the copy out of the tray by a further ultraviolet exposure on the copy. Thus the copy sheet at the time of discharge from the tray is under pressure from two opposing rubber surfaces. The bands or belts 106 can be formed from "O-ring" type material. The conveyor 106 carries the copy under the exposure unit 16, which performs a clearing function, and thence to exit tray 108, thus completing the cycle.

The foregoing completes the description of the preferred embodiment illustrated herein. However, the invention is not limited to the particular details of construction, components and processes described as many equivalents or variations will suggest themselves to those schooled in the art. It is accordingly desired that the appended claims be given a broad interpretation commensurate with the scope of the invention within the art.

What is claimed is:

1. An automatic film copier comprising:
   a. receiving means for receiving a copy sheet of unexposed film and a master sheet of developed film containing an image to be reproduced, the sheets to be inserted together into said receiving means;
   b. exposure means located adjacent to said receiving means for exposing said copy sheet through said master sheet to produce a developable image thereon;
   c. separator means located adjacent to said exposure means for separating said master sheet from said exposed copy sheet;
   d. first conveyor means in association with said receiving means, said exposure means and said separator means for conveying together the master sheet and the copy sheet from said receiving means, across said exposure means, and to said separator means;
   e. developing means located adjacent to said separator means for developing the separated exposed copy sheet;
   f. transition means located adjacent to said developing means for handling the developed copy sheet after it is developed;
   g. second conveyor means in association with said separator means, said developing means, and said transition means for conveying the copy sheet from said separator means across said developing means to said transition means;
   h. exit means including at least one exit tray for receiving the separated master sheet and the developed copy sheet;
   i. third conveyor means including at least one conveyor in association with said exit means for conveying the developed copy sheet to said exit means and for conveying the master sheet to said exit means;
   j. delivery means located adjacent to said separator means and said third conveyor means for delivering the separated master sheet to said third conveyor means; and
   k. transfer means located adjacent to said transition means and said third conveyor means for transferring the developed copy sheet from said transition means to said third conveyor means.

2. The apparatus of claim 1 wherein said separator means comprises:
   a. first guide means for guiding the copy sheet and master sheet along a preselected main path;
   b. deflection means for deflecting the master sheet to a by-pass path at a preselected angle from said main path; and
   c. second guide means for guiding the master sheet along said by-pass path to said delivery means.

3. The apparatus of claim 2 wherein the copy sheet has an angled corner and wherein;
   a. said first guide means comprises an adjacent pair of rigid plates separated by a distance of the order of the thickness of two sheets of film;
   b. said deflection means comprises:
      (i) a spring loaded wire extending across said main path at an oblique angle to engage the master sheet and divert it to said by-pass path, while being deflected against said spring loading by an angled corner of the copy sheet, which corner pushes said wire out of said main path to allow the copy sheet to continue on said main path, and
      (ii) an angled-edged member in association with said first guide means, having an edge with an angled surface defining said by-pass path for directing the diverted master sheet to said second guide means; and
   c. said second guide means comprises at least one member in association with said angle-edged member for guiding the master sheet to said delivery means.

4. The apparatus of claim 2 wherein:
   a. said first guide means comprises an adjacent pair of rigid sheets separated by a distance of the order of the thickness of two sheets of the film;
   b. said deflection means comprises:
      (i) an angled pivot member having a forward tapered edge, normally disposed by gravity to rest in a first position across said main path, presenting said tapered edge at a predetermined angle to the oncoming copy sheet and master sheet, to engage the master sheet and thus divert it to said by-pass path while being urged by an angled corner of the copy sheet to pivot to a second position in which said forward tapered edge is parallel to and off of said main path, and
      (ii) an angled-edged member in association with said first guide means, having an edge with an angled surface defining said by-pass path for directing the diverted master sheet to said second guide means; and
   c. said second guide means comprises at least one member in association with said angle-edged member for guiding the master sheet to said delivery means.

5. The apparatus of claim 2 wherein:
   a. said first guide means comprises:
      (i) a pair of compressively engaged cylindrical rollers, an upper and a lower, associated with said first conveyor means, defining at their intersection to said main path and positioned to receive therebetween the copy sheet and the master sheet, and
      (ii) drive means for rotating said rollers in opposite directions to feed the copy sheet and the master sheet therebetween, while allowing said upper roller rotation to be intermittently interrupted at selected times; and
   b. said deflecting means comprises:
      (i) a pivot arm adapted to pivot and cross said main path upon activation, deflecting the film to said by-pass path, and
      (ii) activating means for causing upper roller rotation to be interrupted for a preselected interval of time while causing said pivort arm to substantially simultaneously pivot and remain pivoted for a like interval of time, and then allow said pivot arm to return; and c. said second guide means comprises at least one member in association with said deflection means for guiding the master sheet to said delivery means.

6. The apparatus of claim 1 wherein there is further included after said separator means clearing means for clearing the copy sheet after passing through said exposure means.

7. The apparatus of claim 6 wherein said exposure means also serves as said clearing means.

8. The apparatus of claim 1 wherein said exposure means, said separator means, said first conveyor means, said developing means, and said second conveyor means are arranged at least generally horizontally in line, and said third conveyor means is arranged at least generally parallel to and below them and carry the master sheet and the copy sheet in the reverse direction.

9. The apparatus of claim 8 wherein said exposure means also serves as said clearing means when the copy sheet is conveyed beneath said exposure means by said third conveyor means.

10. The apparatus of claim 1 wherein said third conveyor system includes only one conveyor, the same conveyor being used to convey the master sheet and subsequently the developed copy sheet.

11. The apparatus of claim 10 wherein said exit means includes only one exit tray, the same exit tray being used to receive the master sheet and subsequently the developed sheet from the same conveyor.

12. A method of automatically exposing and developing a copy sheet of microfiche film in a machine, comprising the following steps:

a. conveying the copy sheet together with a master sheet of film, having an image thereon to be duplicated, across an exposure element, where the copy sheet is exposed;

b. separating the master sheet from the exposed copy sheet;

c. immediately conveying the separated master sheet to an exit station;

d. in the meantime automatically conveying the exposed copy sheet from said exposure element across a developer, where it is developed, and to transition means for handling the developed copy sheet after it is developed;

e. moving the developed copy through said transition means;

f. transferring the developed copy sheet to a conveyor; and g. conveying the developed copy sheet to the exterior of the machine using the same conveying system as carried the master sheet to said exit station; with steps "a" through "g" being performed in a single, integrated, automatic machine.

13. The method of claim 12 wherein said developer is a heat developer and said transition means comprises a separate transition station, and wherein between steps "d" and "e" there is the further step of holding the developed copy in said transition station allowing it to cool for a predetermined period of time.

14. The method of claim 12 wherein in step "g" there is included the step of conveying the developer copy sheet to the same exit station to which the master sheet was conveyed.

15. The method of claim 12 wherein in said "g" there is further included the step of conveying the developed copy sheet in close proximity to the exposure element to clear the developed copy sheet.

16. The apparatus of claim 1 wherein said developer means includes a developing system using heat to develop the exposed copy sheet, and wherein said transition means includes holding means for holding the developed copy sheet for a period of time while it cools.

17. The apparatus of claim 16 wherein:

a. said transition means is a tray adapted to pivot upon activation about an axis perpendicular to said main path between a first position in which said copy sheet is received and temporarily held and a second position in which said copy sheet is brought into contact and engagement with said third conveyor means; and b. said transfer means comprises:
   (i) timing means in association with said tray and responsive to the receipt of a copy sheet on said tray for timing a first predetermined interval after said receipt of the copy sheet, and
   (ii) tilt means responsive to said timing means for causing said tray to pivot at the end of said first interval from said first position to said second position, to remain in said second position for a second predetermined interval, and then to pivot back to said first position.

18. The apparatus of claim 17 wherein:

a. said third conveyor means comprises
   (i) at least one driven roller,
   (ii) at least one additional roller; and
   (iii) a plurality of endless flexible bands disposed in tension around said rollers, defining a conveyor path and moving in response to said driven roller; and b. said tray is provided with a plurality of slots at its end to receive a portion of said bands when said tray is pivoted to said second position.

19. The apparatus of claim 18 wherein said transfer means further comprises an arm pivotally mounted in association with said tray means and responsive to said tilt means, whereby said tilt means causes said arm to pivot when said tray tilts to said second position from a first, non-engaged position to which said arm tends to a second position in which said arm is caused to bear on the copy sheet against said portions of said conveyor bands which extend through said slots.

20. The apparatus of claim 17 wherein:

a. said timing means comprises:
   (i) a normally closed switch, mounted in association with said tray means and responsive to the receipt of the copy sheet on said tray means, which receipt causes said switch to open, and
   (ii) an electronic timing circuit connected to said switch and responsive to the opening thereof, which produces a signal of the duration of said second predetermined interval after said first predetermined interval has past; and b. said tilt means comprises:
   (i) an arm connected in association with said tray along said tray pivot axis and adapted to convert an applied linear force into a rotational force on said tray, and
   (ii) a solenoid connected mechanically to said arm and electrically to said timing circuit and adapted to produce a linear force on said arm while said signal is applied thereto.

* * * * *